United States Patent Office 2,792,847
Patented May 21, 1957

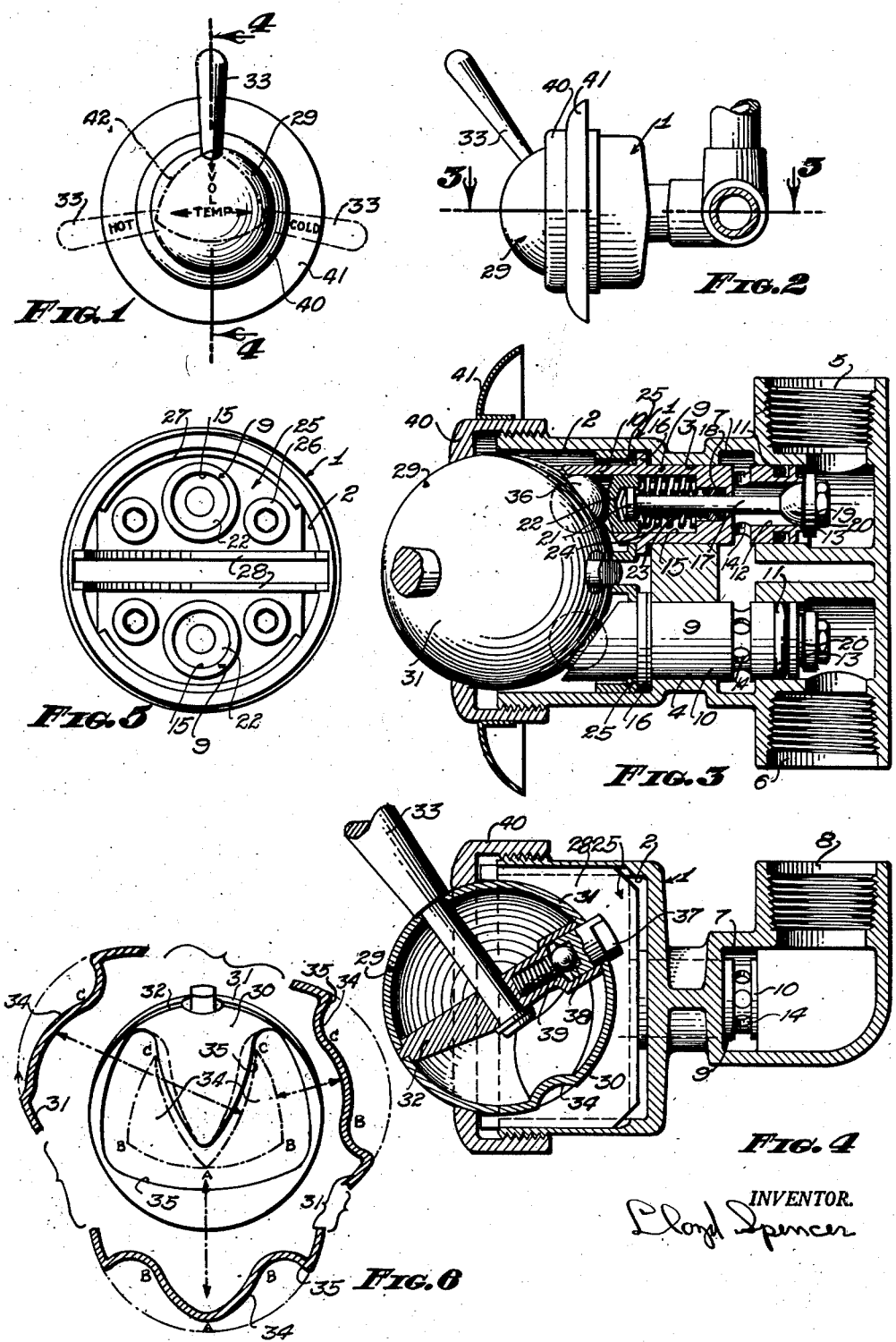

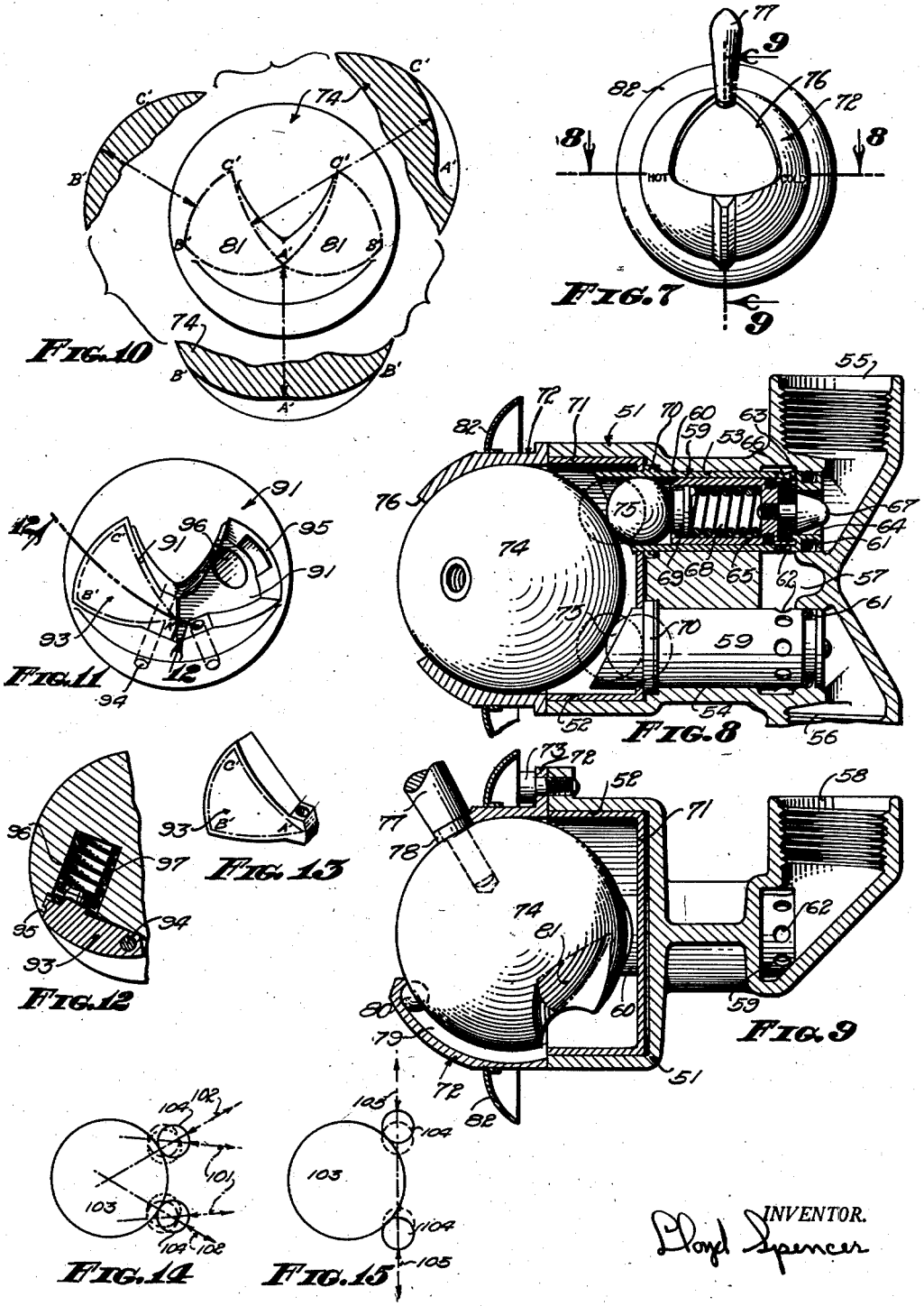

2,792,847
MIXING VALVES
Lloyd Spencer, Los Angeles, Calif.
Application February 9, 1953, Serial No. 335,941
38 Claims. (Cl. 137—636.2)

My invention relates to mixing valves and is a continuation-in-part of my previously filed application for Mixing Valves, Serial Number 589,768, filed April 23, 1945, now abandoned, and is intended to incorporate all the patentable subject matter thereof. Included in the objects of my invention are:

First, to provide a mixing valve which incorporates a novel control means whereby a single handle is capable of regulating either of a pair of valves, such as a hot and cold water valve, either independently or simultaneously, movement of the handle in one direction effecting change in volume and movement in a transverse direction effecting change in temperature.

Second, to provide a mixing valve which may be arranged to utilize substantially conventional valve washers and seats so that in the event of replacement or repair of the washers and seats, one unfamiliar with the mixing valve can proceed with replacement in the same manner as with a conventional hot or cold water faucet.

Third, to provide a mixing valve which may be arranged to utilize valve elements designed to open in response to line pressure of the water, or valve elements designed to close in response to such line pressure.

Fourth, to provide a mixing valve which facilitates the use of valve cartridges having both valve washer and seats wherein the entire valve cartridge may be removed for replacement as a unit.

With the above and other objects in view, reference is directed to the accompanying drawings, in which Figure 1 is a front view of one form of my mixing valve, shown as arranged for wall mounting.

Figure 2 is a side elevational view thereof.

Figure 3 is an enlarged sectional view thereof taken through 3—3 of Fig. 2.

Figure 4 is an enlarged sectional view thereof taken through 4—4 of Fig. 1.

Figure 5 is an end view of the mixing valve with the cam ball and cap removed.

Figure 6 is a composite view showing the rear side of the cam ball and indicating in fragmentary sectional views the contours along the boundaries of the cam surfaces.

Figure 7 is a front elevational view of a modified form of my mixing valve.

Figure 8 is an enlarged sectional view thereof taken through 8—8 of Fig. 7.

Figure 9 is an enlarged sectional view thereof taken through 9—9 of Fig. 7.

Figure 10 is a composite view showing the rear side of the cam ball and indicating in fragmentary sectional views the contour of the cam surfaces at their margins.

Figure 11 is a rear view of a modified form of the cam ball in which movable cam inserts are provided.

Figure 12 is a fragmentary sectional view thereof taken through 12—12 of Fig. 11.

Figure 13 is a perspective view of one of the cam inserts.

Figures 14 and 15 are diagrammatical views showing various axes along which the valve elements may be operated by the cam ball.

Reference is first directed to the mixing valve construction shown in Figs. 1 to 6 inclusive. The construction here shown is so arranged that the valve elements close in response to line pressure and open against line pressure.

The mixing valve includes a valve body 1 having a cylindrically recessed forward end 2 the bottom of which is intersected by a pair of valve recesses 3 and 4. The rear ends of the valve recesses are intersected by corresponding inlet ports 5 and 6. Forwardly of the inlet ports, the valve recesses 3 and 4 traverse a common outlet chamber or mixer chamber 7 communicating with an outlet port 8.

Each valve recess receives a valve cartridge 9 comprising a tubular liner 10 adapted to slide in the recess and having a seal ring 11 near its inner end to isolate the inlet port 5 or 6 from the mixer chamber 7. The inner end of each liner forms an inlet passage 12 having a valve seat 13 at its inner end directed toward the inlet port 5 or 6, and lateral ports 14 communicating with the mixer chamber 7.

The outer end of each liner defines a plane in acute angular relation with the axis of the liner and is provided with a socket 15 coaxial with the passage 13. Near its angular outer end, the liner is provided with a mounting flange 16. Within the liner is a valve stem 17 which passes through a packing gland 18 separating the socket 15 from the passage 13. The inner end of each stem 17 is provided with a pintle 19, cooperating with the inlet end of the passage 13 to control flow therethrough, and a valve washer 20 which overlies and seats against the valve seat 13.

The outer end of each stem 17 is provided with a head 21 and a cap 22. A spring 23 bears against the packing gland 18 and head 21 to urge the valve washer 20 toward its seat, although the main seating force is supplied by the line pressure of water against the washer. A second spring 24 is interposed between the cap 22 and base of the socket 15.

The two valve cartridges 9 are held in place by a pair of retainer plates 25 which engage the flanges 16 and seat them against the bottom of the recess 2 in the forward end of the valve body. Sealing washers may be interposed. The retainer plates 25 are secured by screws 26. Each retainer plate includes an arcuate peripheral flange 27 conforming to the wall of the recess 2 and a diametrically extending inner flange 28. The two flanges 28 define therebetween a key slot and their edges are cut to form a semi-circle at right angles to the axis of the recess 2. The flanges 28 may be retained at their diametrical extremities in axially directed channels formed in the walls of the recess 2.

Mounted in the recess 2 is a cam ball 29 which may comprise a hollow rear shell 30, and a hollow forward shell 31, both of a hemispherical contour, separated by a partition 32. The parts are suitably secured as by furnace brazing. The partition and forward shell support a handle 33 which extends radially from the cam ball. The rear shell is provided with a pair of joined cam depressions 34, which, as will be brought out hereinafter, approximate the shape of spherical triangles. The margins of the cam depressions form retainer rims 35.

The cam ball is cradled in the semi-circular edge portions of the flanges 28 and is supported by a pair of cam follower balls 36 which ride in the cam depressions 34 and fit in the outer ends of the sockets 15 to bear against the caps 22. The partition 32 is provided with a radial socket in which fits a key pin 37 flattened on two sides so as to ride in the key slot formed between the flanges 28.

The key pin pivots in its socket in the course of movement of the cam ball and therefore may rest on a pivot ball 38 backed by a spring 39 so that the shoulders formed at the two flattened sides of the pin may bear against the edges of the flanges 28.

The forward end of the valve body 1 is externally screw-threaded to receive a retainer ring 40 which has an opening slightly smaller than the diameter of the cam ball to retain the cam ball in place. The cam ball is urged against the ring 40 by action of the spring 39 and the springs 24.

The mixing valve is shown as adapted for wall mounting in which case the forward end of the valve body 1 projects slightly from the wall. An escutcheon ring 41 may fit around the retainer ring 40 to cover the margins of the wall opening, which accommodates the valve body.

The cam depressions 34 approximate spherical triangles and their peripheries are generated by the points of contact of the cam follower balls 36 when the handle 33 of the cam ball 29 is moved in the triangular path, designated 42, in Fig. 1, while the cam ball is restrained against rotation about the axis of the handle by action of the key pin 37 in the key slot formed by flanges 28.

That is, the cam ball has freedom of movement in two directions of rotation, but is restrained in the third direction of rotation by the key pin 37. Ideally the key pin should be at right angles to the handle 33, but in order to obtain maximum movement of the handle it is desirable to displace the axis of the key pin from a true right angle position. This does not adversely affect operation.

The cam areas are set into the cam ball sufficiently deep that the rim 35 and cam follower balls 36 restrict the handle to movement within the boundaries of the triangle 42. It has been found advantageous for maximum movement of the handle, and therefore maximum control of the valves, that the triangle 42 be an equilateral spherical triangle the sides of which are bowed outward from a true great circle line.

The surfaces of the cam areas 34 within the rim 35 are essentially spherical in contour but their centers of curvature are displaced from the center of the cam ball. They may join at one apex, designated A, in Fig. 6. This is the shallowest point in each cam area. The cam depressions recede into the cam ball from this point so that their sides A—B and A—C slope or diverge relative to the surface of the cam ball. The remaining side B—C of each cam depression is concentric with the surface of the cam ball, and constitutes the deepest side of each cam depression.

Operation of my mixer valve is as follows:

When the handle 33 is in its upper position shown in Figs. 1, 2, 3 and 4, the two cam follower balls 36 are disposed at points C in the cam depressions 34. In this position, both valves are closed.

If the handle 33 is moved downwardly and to the right, or downwardly and to the left, one of the cam follower balls will move from C to A while the other moves from C to B. Inasmuch as C—B is concentric with the surface of the cam ball, and C—A slopes or converges relative thereto, only one of the cam follower balls moves outwardly from the cam ball and opens the corresponding valve.

Thus if, as viewed in Fig. 3 the lower inlet is the "cold" inlet and the upper inlet the "hot" inlet, movement of the handle 33 downwardly to the right operates only the "cold" valve; whereas downward movement to the left operates only the "hot" valve. Movement of the handle transversely at any level opens one valve and closes the other.

It will be observed that at lower rates of flow through the valves, more accurate control of the rate of flow is desirable. This is accomplished by selecting the desired curvature of the cam areas and by selecting the desired contour for the pintles 19.

It will be observed that in this position, there is clearance between the caps 22 and heads 21. This is to allow for wear of the valve washers 20. The main purpose of the caps 22 and springs 24 is to urge the cam ball against the retainer ring 40 so that the handle 33 will tend to remain in its upper or "off" position. Inasmuch as this may also be accomplished by the action of the key pin and its spring 39, either the caps 22 and their springs 24 or the key pin spring may be omitted.

In order to repair or replace the valves, the retainer ring 40 is removed, permitting removal of the cam ball and access to the screws 26 which hold the retainer plates 25. On removal of the retainer plates the valve cartridges 9 can be removed and either new cartridges substituted or the valve washers 20 replaced. It will be observed that the valve washers 20 may be conventional so that repair of the mixing valve is much in the same manner as a conventional faucet valve.

Reference is now directed to Figs. 7 to 10 inclusive. The construction here shown is in most respects similar to the first described structure but is arranged for opening with water pressure instead of closing with water pressure.

A valve body 51 is provided which may be similar to the valve body 1. The forward end is provided with a cam ball receiving recess 52, from the bottom of which extend rearwardly directed valve cartridge bores 53 and 54 communicating respectively with inlet ports 55 and 56. The bores 53 and 54 traverse a common outlet or mixer chamber 57 which communicates with an outlet port 58.

Each bore 53 or 54 receives a valve cartridge 59. Each valve cartridge includes a liner 60 having a seal ring 61 near its extended end to isolate the inlet port 55 or 56 from the mixer chamber 57. The liner 60 is provided with lateral ports 62 which discharge into the mixer chamber 57. Between these ports and the inner end of the liner, its bore is constricted to form an inlet passage 63 terminating at its outer end adjacent the ports 62 in a valve seat 64.

Slidable within and sealingly engaging the walls of the liner outwardly of the ports 62 is a plunger 65 which carries a valve washer 66 engageable with the seat 64 and a pintle 67 cooperating with the passage 63 to determine the rate of flow for various open positions of the valve washer. The pintle also serves as a screw to hold the valve washer in place. The plunger 65 is hollow and receives a stiff spring 68 which bears against a disk 69 restrained at the outer end of the plunger by an internal flange.

Near its outer end the liner 60 is provided with an external flange 70. The two liners are retained in place by a retainer cup 71 which fits within the recess 52. Fitted over the outer end of the valve body and covering the recess 52 is a retainer cap 72 which is secured to the body 51 by screws 73. The cap 72 engages the rim of the cup 71 thereby to hold the valve cartridges in place. The retainer cap 72 is essentially hemispherical in internal contour and journals a cam ball 74. Cam follower balls 75 are interposed between the cam ball and the disks 69 of the plungers 65 and are guided by the walls of the liners 60. The forward extremities of the liners 60 are angular to clear the cam ball.

The retainer cap 72 is provided with a triangular aperture 76, preferably located in the upper quadrant of the cap as viewed in Figs. 7 and 9, and preferably having convex sides to define an area corresponding to the area 42 shown in Fig. 1. A handle 77 extends radially from the cam ball through the aperture 76 and is guided in its limits of movement by the margins of the aperture. To minimize wear, the handle may be provided with a roller 78.

In order to limit movement of the cam ball to two directions of movement, that is, to restrain its movement about the axis of the handle 77, the lower quadrant of the retainer cap 72 is provided with a key slot or channel 79 in which rides a key ball 80 set in the cam ball at substantially right angles to the axis of the handle 77.

Movement of the handle 77 within the limits of the aperture 76 causes the points of contact of the cam follower balls 75 to generate substantially spherical triangular areas 81 on the back side of the cam balls. These areas may be approximately spherical in contour and are cammed by displacing their centers of curvature away from the center of the cam ball. They may have a common apex A' depressed in the cam ball and apexes B' and C' at the normal surface of the cam ball as shown best in Fig. 12.

It will be observed that the direction of movement of the cam follower balls 75 in order to open the corresponding valves is in the opposite direction to the opening movement of the first described structure.

It will be observed also that the entire cam areas 81 may be depressed as in the first described structure so that the engagement of the cam follower balls with the margins of the cam areas limit movement of the handle instead of the margins of the aperture 76. Conversely, the arrangement here shown may be employed to control the cam ball of the first described structure.

Operation of the mixing valve shown in Figs. 7 through 10 is as follows:

When the handle 77 is in its upper position shown in Figs. 7, 8 and 9 body valves are in their "off" position. As in the first described structure, movement of the handle down one side of the triangular aperture 76 operates the "cold" valve, movement down the other side of the aperture operates the "hot" valve and transverse movement opens one and closes the other.

The springs 68 allow over travel of the cam balls so as to compensate for wear of the valve washers 66, and of course must be strong enough to hold the valves closed against water pressure.

The valve body may be modified and the placement of the inlet and outlet ports varied to adapt the mixing valve to various applications such as sink "swing-spout," shower or lavatory installations; however, the operation of the valve cartridges, cam ball and cam follower balls remains unchanged. For purposes of illustration, the mixer valve is shown as a wall mounted shower valve in which only the forward end of the valve body is exposed. An escutcheon ring 82 may fit around the cap 72 to conceal the opening through which the valve body extends.

Reference is now directed to Figs. 11, 12 and 13 which illustrate a modified means of compensating for valve washer wear. This is accomplished by providing a cam ball 91 having cam recesses 92 in excess of the needed cam areas and seating therein cam inserts 93. The cam inserts define the cam areas A'—B'—C' of Fig. 10 and are pivotally supported by pins 94 adjacent their confronting or common apexes A'. The remote margins of the recesses 92 are undercut to form stop shoulders 95. The bottoms of the recesses are provided with sockets 96 which receive springs 97 which urge the cam inserts 93 outwardly.

The cam ball 91 is substituted for the cam ball 74 and solid plungers substituted for the plungers 65. The springs 97 are, of course, of sufficient strength to close the valves against line pressure.

In the structures described, the axes of the valve cartridge bores are shown as parallel; however, this is not mandatory for operation of the mixing valve and for design considerations it is desirable to converge these axes as indicated by 101, or diverge these axes as indicated by 102 as shown in Fig. 14 in which 103 indicates the cam ball and 104 indicates the cam follower balls.

The points of contact of the two cam follower balls have been arbitrarily shown as about 60° apart on the cam ball; however, they may be closer or further apart. If spread further apart the axes of the valve cartridges may diverge a full 180° as indicated by 105 in Fig. 15.

In any case the inter-operation of the cam ball, cam follower balls and valve cartridges is not changed.

Although I have shown and described certain embodiments of my invention I do not wish to be limited thereto, but desire to include in the scope of my invention all novelty inherent in the appended claims.

I claim:

1. An operating means for actuating a pair of reciprocable control units, wherein each unit includes reciprocably mounted cam followers: a cam structure including a spherical journal portion and a pair of cam portions each having a boundary concentric with said journal portion and a cam surface sloping therefrom eccentric with respect to said journal portion, said surfaces being of substantially the same shape and slope and arranged symmetrically with respect to a diametral plane of said journal portion; each cam portion positioned with its cam surface traversing the axis of reciprocation of a corresponding cam follower; means for rotating said cam structure about two mutually perpendicular axes intersecting at the center of said spherical journal portion to effect corresponding movement of said cam surfaces across the axes of reciprocation of said cam followers to move the cam followers in unison, in opposition or individually, the latter movement being effected when one of said concentric boundaries constitutes the path across the axis of reciprocation of a cam follower.

2. A mixing valve assembly, comprising: a body structure having a journal means; an actuating member fitted in said journal means for universal swiveling movement about a center point; means for restricting said actuating member to selective movement about two axes intersecting at said center point; a pair of valve units in said body structure having separate inlets and a common outlet; a pair of cams formed on said actuating member and having substantially spherical surfaces disposed eccentrically with respect to said common center of movement; said surfaces being of substantially the same slope and shape and arranged symmetrically with respect to a radial plane through said center point; a pair of cam followers reciprocable along fixed axes traversed by said cams, each cam follower engaging one of said cams and operatively connected to one of said valve units to effect opening and closing thereof; and a handle fixed to said actuating member whereby said actuating member may be turned in said journal means to move said cam surfaces across the axes of said cam followers to open either or both of said valve units to any extent within the range of movement provided by said cams.

3. The combination with a pair of valve units having reciprocable control elements, of an operating means therefor, comprising: a pair of reciprocable cam followers operatively connected to the control elements of said valve units; an actuating member confronting said cam followers and having a pair of cam surfaces of substantially spherical contour traversing and engageable by said cam followers; means journalling said actuating member for universal swiveling movement about a center point and means limiting said actuating member to movement about two angularly related axes intersecting at said center point to cause each of said cam surfaces to traverse its cam follower in all directions within the boundaries of said cam surfaces; said cam surfaces being of substantially the same shape and slope and arranged symmetrically with respect to a radial plane through said center point; said spherical cam surfaces being so oriented that either or both of said valve units may be opened and closed within the range of movement provided by said cam surfaces, depending upon the direction of movement of said actuating means.

4. A control mechanism, comprising: a body structure having a journal means; an actuating member fitted in said journal means for universal swiveling movement about a center point; means for restricting said actuating member to selective movement about two angularly related axes intersecting at said center point; a pair of control units in said body structure; a pair of cams formed on said actuating member and having substantially spherical surfaces disposed eccentrically with respect to said common center of movement; said cam surfaces being of substantially the same shape and slope and arranged symmetrically with respect to a radial plane through said center point; a pair of cam followers each engaging a corresponding cam and having an axis of reciprocation traversing said cam and operatively connected to one of said control units to effect movement thereof; and a handle fixed to said actuating member whereby said actuating member may be turned in said journal means to move either or both of said control units to any extent within the range of movement of said cams.

5. The combination with a pair of control units having reciprocable control elements, of an operating mechanism therefor, comprising: a pair of reciprocable cam followers operatively connected to the control elements of said control units; an actuating member confronting said cam followers and having a pair of cam surfaces of substantially spherical contour engageable by said cam followers and traversed by the axes of reciprocation thereof; means journalling said actuating member for universal swiveling movement about a center point; and means limiting said actuating member to movement about two angularly related axes intersecting at said center point to cause each of said cam surfaces to move selectively across the axis of reciprocation of its cam follower as said actuating member is moved about said axes; said cam surfaces being of substantially the same shape and slope and arranged symmetrically with respect to a radial plane through said center point; said spherical cam surfaces being so oriented that either or both of said control units may be operated within the range of movement provided by said surfaces, depending upon the direction of movement of said actuating member.

6. A mixing valve for controlling the resultant volume and temperature of water from a hot and cold source, comprising: a housing structure defining hot and cold water inlets and a common outlet, valve bores and a cam compartment; valve units moveable in said valve bores to control said inlets and including cam followers; a cam mounted in said compartment for selective rotation about and restricted to two angularly related axes intersecting at a center point and having cam surfaces engaged by said cam followers; said cam surfaces being of substantially the same shape and slope and arranged symmetrically with respect to a radial plane through said center point; each of said cam surfaces being of varying distance from said axes, and moveable across said cam followers as said cam is turned to any extent within the range of movement provided by said cam surfaces.

7. An operating means for actuating reciprocable control elements, comprising: reciprocable cam followers operatively connected with corresponding control elements; a cam compartment exposed to said cam followers; a cam having a spherical portion journalled in said compartment for rotation about and restricted to two angularly related axes intersecting at a center point, said cam defining cam surfaces generally of the form of spherical triangles adapted to traverse said cam followers; said cam surfaces being of substantially the same shape and slope and arranged symmetrically with respect to a radial plane through said center point; said cam surfaces being of varying radial distance from said angularly related axes to effect differential and unison movement of said cam followers upon selected movements of said cam.

8. A mixing valve comprising: a pair of valve units, each including a cam follower; a cam member having a journalled portion of spherical contour engaged by said cam followers; a housing for journalling said cam member; a handle for said cam member extending from said housing; means for restraining said cam member against rotation about the axis of said handle whereby said cam member and handle are limited essentially to two mutually perpendicular directions of movement about a common center; means for confining movement of the cam member and handle to a substantially triangular area whereby the cam followers trace on said cam member corresponding triangular cam areas; cams formed on the surface of said cam member within said cam areas, said cams being contoured to effect movement of said valve units in the same direction and at the same rate when moved in a first direction, maximum differential amounts when moved in a second direction, and in unison but at different rates when moved in directions intermediate said first and second directions, said cams arranged to provide movement of said cam followers in excess of that required to close said valve units.

9. A mixing valve as set forth in claim 8 wherein: said cam surfaces are depressed into the surface of said cam member and form marginal rims engageable by said cam followers to constitute said movement confining means.

10. A mixing valve as set forth in claim 8 wherein: a retainer member fits over the cam member and is provided with an aperture; said handle extends from the cam member through said aperture, and the boundaries of said aperture cooperate with said handle to constitute said movement confining means.

11. A mixing valve as set forth in claim 8 wherein: said valve units close in response to water pressure at said water inlets and clearance is provided between said cam followers and valve units when said valve units are in their closed position to utilize said excess movement of said cam followers to compensate for wear of the valve units.

12. A mixing valve as set forth in claim 8 wherein: said valve units open in response to water pressure at said water inlets and spring means are interposed between said cam followers and valve units to permit travel of the cam followers on said cam surfaces after closure of said valve units, thereby to utilize said excess movement of said cam followers to compensate for wear of said valve units.

13. A mixing valve as set forth in claim 8 wherein: said valve units open in response to water pressure at said water inlets and said cam surfaces are yieldably mounted and spring backed to permit travel of the cam followers on said cam surfaces after closure of said valve units, thereby to utilize said excess movement of said cam followers to compensate for wear of said valve units.

14. A mixing valve, comprising: a valve body defining a cam receiving recess at its forward end, a pair of valve bores extending therefrom communicating at their extended ends with a pair of inlet ports, and intersecting intermediate their ends a common outlet chamber; a pair of valve cartridges insertable in said bores from said recess, each valve cartridge including valve means for controlling flow from a corresponding inlet to said outlet chamber, and a cam follower ball at its forward end confronting said valve body recess; means for securing said valve cartridges in their respective bores; a cam ball journalled in said recess for engagement by said cam follower balls; means for limiting said cam ball to selective movement about two angularly related axes intersecting at a center point; said cam ball having a pair of cam surfaces of generally triangular shape of varying radial distance from said center for reciprocating said cam followers; said cam surfaces being of substantially the same shape and slope and arranged symmetrically with respect to a radial plane through said center point, thereby to control said valve means; and a handle extending from the forward side of said cam ball.

15. A mixing valve, comprising: a valve body defining a cam ball receiving recess at its forward end; a pair of valve bores extending therefrom communicating at their extending ends with a pair of inlet ports, and intersecting intermediate their ends a common outlet chamber; a pair of valve cartridges insertable in said bores from said recess, each valve cartridge including valve means for controlling flow from a corresponding inlet to said outlet chamber, and a cam follower ball at its forward end confronting said valve body recess; means for securing said valve cartridges in their respective bores; a cam ball journalled in said recess for engagement by said cam follower balls and having a pair of cam surfaces of substantially spherical contour defining centers displaced from the center of the cam ball; said cam surfaces being of substantially the same shape and slope and arranged symmetrically with respect to a diametral plane of said cam ball; means within said recess confronting the back side of said cam ball and defining a key channel; a key member extending from said cam ball into said key channel to limit said cam ball to rotation about two axes intersecting at its center; a handle extending from the forward side of said cam ball substantially at right angles to said key member.

16. A mixing valve as set forth in claim 15 wherein: said cam surfaces have peripheral rims which engage said cam follower balls to confine said follower balls within the boundaries of said cam surfaces.

17. A mixing valve as set forth in claim 15 wherein: the forward side of said cam ball is covered by a cap apertured to receive said handle, the margins of said aperture cooperating with said handle to confine movement of said cam follower balls within the boundaries of said cam surfaces.

18. An operating means as set forth in claim 1, wherein: said cam portions are depressed into the surface of said cam structure and form marginal rims engageable by said cam followers to confine the movement of said cam followers to the areas within the boundaries of said cam portions.

19. An operating means as set forth in claim 1, wherein: a retainer member fits over the cam member and is provided with an aperture; a handle extends from said cam structure through said aperture; and the boundaries of said aperture cooperate with said handle to confine movement of said cam followers to the areas within the boundaries of said cam portions.

20. An operating means as set forth in claim 1, wherein: said reciprocable control units move in approximately parallel paths.

21. An operating means as set forth in claim 1, wherein: said reciprocable control units move in paths intersecting approximately at the center of said spherical journal portion.

22. An operating means as set forth in claim 1, wherein: said reciprocable control units are approximately coaxial.

23. A mixing valve assembly as set forth in claim 2, wherein: said cam surfaces are depressed into the surface of said actuating member and form marginal rims engageable by said cam followers to confine the movement of said cam followers to the areas within the boundaries of said cam surfaces.

24. A mixing valve assembly as set forth in claim 2, wherein: a retainer member fits over said actuating member and is provided with an aperture; a handle extends from said actuating member through said aperture; and the boundaries of said aperture cooperate with said handle to confine movement of said cam followers to the areas within the boundaries of said cam portions.

25. A mixing valve assembly as set forth in claim 2, wherein: said valve units close in response to fluid pressure and clearance is provided between said cam followers and valve units when said valve units are in their closed position to compensate for wear of said valve units.

26. A mixing valve assembly as set forth in claim 2, wherein: said valve units open in response to fluid pressure and spring means are interposed between said cam followers and said valve units to permit travel of the cam followers on said cam surfaces after closure of said valve units to compensate for wear of said valve units.

27. A mixing valve assembly as set forth in claim 2, wherein: said valve units open in response to fluid pressure and said cams are pivotally mounted and spring-backed to permit travel of the cam followers on said cam surfaces after closure of said valve units, to compensate for wear of said valve units.

28. A mixing valve assembly as set forth in claim 2, wherein: said valve units reciprocate in approximately parallel paths.

29. A mixing valve assembly as set forth in claim 2, wherein: said valve units reciprocate in paths intersecting approximately at the center of movement of said actuating member.

30. A mixing valve assembly as set forth in claim 2, wherein: said valve units reciprocate in approximately coaxial paths.

31. A mixing valve as set forth in claim 6, wherein: all margins of said cam surfaces are depressed below the normal surface of said cam to form marginal rims engageable by said cam followers to confine the movement of said cam followers to the areas defined by said cam surfaces.

32. A mixing valve as set forth in claim 6, wherein: a retainer member fits over said cam and is provided with an aperture; a handle extends from said cam through said aperture; and the boundaries of said aperture cooperate with said handle to confine movement of said cam followers to the areas defined by said cam surfaces.

33. A mixing valve as set forth in claim 6, wherein: said valve units close in response to water pressure and clearance is provided between said cam followers and valve units when said valve units are in their closed position to compensate for wear of said valve units.

34. A mixing valve as set forth in claim 6, wherein: said valve units open in response to fluid pressure and spring means are interposed between said cam followers and said valve units to permit travel of the cam followers on said cam surfaces after closure of said valve units to compensate for wear of said valve units.

35. A mixing valve as set forth in claim 6, wherein: said valve units open in response to fluid pressure and said cam surfaces are pivotally mounted and spring-backed to permit travel of the cam followers on said cam surfaces after closure of said valve units, to compensate for wear of said valve units.

36. A mixing valve as set forth in claim 6, wherein: said valve bores are in approximate parallelism.

37. A mixing valve as set forth in claim 6, wherein: said valve bores have axes intersecting approximately at said center point.

38. A mixing valve as set forth in claim 6, wherein: the axes of said valve bores are approximately coaxial.

References Cited in the file of this patent

UNITED STATES PATENTS

| Number | Name | Date |
| --- | --- | --- |
| 660,735 | Ormerod | Oct. 30, 1900 |
| 963,221 | Haynes | July 5, 1910 |
| 1,478,688 | Whidden | Dec. 25, 1923 |
| 1,573,210 | Whidden | Feb. 16, 1926 |
| 1,919,234 | Leigh | July 25, 1933 |
| 2,205,684 | Cochran | June 25, 1940 |